United States Patent
Rezagholizadeh et al.

(10) Patent No.: US 11,586,833 B2
(45) Date of Patent: Feb. 21, 2023

(54) SYSTEM AND METHOD FOR BI-DIRECTIONAL TRANSLATION USING SUM-PRODUCT NETWORKS

(71) Applicants: Mehdi Rezagholizadeh, Montreal (CA); Vahid Partovi Nia, Montreal (CA); Md Akmal Haidar, Montreal (CA); Pascal Poupart, Kitchener (CA)

(72) Inventors: Mehdi Rezagholizadeh, Montreal (CA); Vahid Partovi Nia, Montreal (CA); Md Akmal Haidar, Montreal (CA); Pascal Poupart, Kitchener (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 16/900,481

(22) Filed: Jun. 12, 2020

(65) Prior Publication Data
US 2021/0390269 A1    Dec. 16, 2021

(51) Int. Cl.
*G06F 40/58*    (2020.01)
*G06N 3/08*    (2023.01)
*G06N 3/04*    (2023.01)

(52) U.S. Cl.
CPC .......... *G06F 40/58* (2020.01); *G06N 3/0454* (2013.01); *G06N 3/08* (2013.01)

(58) Field of Classification Search
CPC ..................................................... G06F 40/58
See application file for complete search history.

(56) References Cited

U.S. PATENT DOCUMENTS 6,289,329 B1 * 9/2001 Sethi ................... G06N 3/0427
706/26
2018/0329898 A1    11/2018 Fujiwara et al.
(Continued)

FOREIGN PATENT DOCUMENTS

CN        103500208 A     1/2014
CN        110222350 A     9/2019
(Continued)

OTHER PUBLICATIONS

Poon, et al., "Sum-Product Networks: A New Deep Architecture," Computer Vision Workshops, 2011. (see Previous Office action) (Year: 2011).*
(Continued)

*Primary Examiner* — Feng-Tzer Tzeng (57) ABSTRACT

A method and machine translation system for bi-directional translation of textual sequences between a first language and a second language are described. The machine translation system includes a first autoencoder configured to receive a vector representation of a first textual sequence in the first language and encode the vector representation of the first textual sequence into a first sentence embedding. The machine translation system also includes a sum-product network (SPN) configured to receive the first sentence embedding and generate a second sentence embedding by maximizing a first conditional probability of the second sentence embedding given the first sentence embedding and a second autoencoder receiving the second sentence embedding, the second autoencoder being trained to decode the second sentence embedding into a vector representation of a second textual sequence in the second language.

18 Claims, 8 Drawing Sheets

(56) References Cited

U.S. PATENT DOCUMENTS

| | | | |
|---|---|---|---|
| 2019/0213261 A1 | 7/2019 | Mochida et al. | |
| 2019/0251178 A1 | 8/2019 | Tu et al. | |
| 2019/0332677 A1* | 10/2019 | Farhan | G06F 40/51 |

FOREIGN PATENT DOCUMENTS

| | | |
|---|---|---|
| CN | 110457713 A | 11/2019 |
| CN | 110874537 A | 3/2020 |
| WO | 2013014877 A1 | 1/2013 |

OTHER PUBLICATIONS

Mahata, et al., "MTIL2017: Machine Translation Using Recurrent Neural Network on Statistical Machine Translation," Journal of Intelligent Systems, 2018. (see Previous Office action) (Year: 2018).*

Mahata, et al., "MTIL2017: Machine Translation Using Recurrent Neural Network on Statistical Machine Translation," Journal of Intelligent Systems, 2018. (Year: 2018).*

Poon, et al., "Sum-Product Networks: A New Deep Architecture," Computer Vision Workshops, 2011. (Year: 2011).*

Cheng, W.-C., Kok, S., Pham, H. V., Chieu, H. L. and Chai, K. M. A. (2014) Language modeling with sum-product networks. In Fifteenth Annual Conference of the International Speech Communication Association 2014.

Delalleau, O. and Bengio, Y. (2011) Shallow vs. deep sum-product networks. In Advances in Neural Information Processing Systems, pp. 666-674 2011.

Gehring, J., Auli, M., Grangier, D., Yarats, D. and Dauphin, Y. N. (2017) Convolutional sequence to sequence learning. arXiv preprint arXiv: 1705.03122 2017.

Gens, R. and Pedro, D. (2013) Learning the structure of sum-product networks. In International Conference on Machine Learning, pp. 873-880 2013.

Ghahramani, Z. (2015) Probabilistic machine learning and artificial intelligence. Nature 521(7553), 452-459 2015.

Hsu, W., Kalra, A. and Poupart, P. (2017) Online structure learning for sum-product networks with gaussian leaves. arXiv preprint arXiv: 1701.05265 2017.

Lample, G., Denoyer, L. and Ranzato, M. (2017) Unsupervised machine translation using mono-lingual corpora only. arXiv preprint arXiv: 1711.00043 2017.

Lee, S.-W., Heo, M.-O. and Zhang, B.-T. (2013) Online incremental structure learning of sum product networks. In International Conference on Neural Information Processing, pp. 220-227 2013.

Melibari, M., Poupart, P. and Doshi, P. (2016) Decision sum-product-max networks. In AAAI, pp. 4234-4235 2016.

Morris, C. N. (1982) Natural exponential families with quadratic variance functions. The Annals of Statistics pp. 65-80 1982.

Neal, R. M. (2011) MCMC using Hamiltonian dynamics. Handbook of Markov Chain Monte Carlo 2(11) 2011.

Poon, H. and Domingos, P. (2011) Sum-product networks: A new deep architecture. In Computer Vision Workshops (ICCV Workshops), pp. 689-690 2011.

Sharir, O. and Shashua, A. (2017) Sum-product-quotient networks. arXiv preprint arXiv: 1710.04404 2017.

Sutskever, I., Vinyals, O. and Le, Q. V. (2014) Sequence to sequence learning with neural networks. In Advances in neural information processing systems, pp. 3104-3112 2014.

Vaswani, A., Shazeer, N., Parmar, N., Uszkoreit, J., Jones, L., Gomez, A. N., Kaiser, L. u. and Polosukhin, I. (2017) Attention is all you need. In Advances in Neural Information Processing Systems 30, eds I. Guyon, U. V. Luxburg, S. Bengio, H. Wallach, R. Fergus, S. Vishwanathan and R. Garnett, pp. 6000{6010. Curran Associates, Inc 2017.

Zohrer, Matthias et al, Representation Learning for Single-Channel Source Separation and Bandwidth Extension, IEEE/ACM Transactions on Audio, Speech, and Language Processing, No. 12 vol. 23, 12 pages. Dec. 23, 2015.

* cited by examiner

SYSTEM AND METHOD FOR BI-DIRECTIONAL TRANSLATION USING SUM-PRODUCT NETWORKS

FIELD

Embodiments described herein generally relate to machine translation of textual sequences and, more particularly, to systems and methods that bi-directionally translate textual sequences between at least two languages.

BACKGROUND

The processing of the textual sequences in human languages (e.g., English, French, German, etc.) by a computing device is generally referred to as Natural Language Processing (NLP). In this context, a textual sequence is typically a sequence of text or words that form a sentence or phrase, having a particular semantic meaning or narrative concept. One aspect of NLP is machine translation (MT), which employs a specifically-configured computer system (also referred to as a MT system) operative to receive a textual sequence in a first (source) human language, process the textual sequence in the source language, to predict a textual sequence in a second (target) human language that expresses the same or similar narrative concept as the textual sequence in the first human language.

MT systems may implement a language model that applies a statistical probability distribution regarding textual sequence to translate textual sequence in a source human language to textual sequence in a target human language. MT systems may implement Neural Machine Translation (NMT) that include artificial neural networks that are trained to learn a single language model (e.g. a sequence-to-sequence model) that predicts a textual sequence in a target language given a textual sequence in source language. The artificial neural networks may be arranged in an encoder-decoder architecture.

However, while the process of translating textual sequence from one language to another may be straightforward for a skilled human translator to perform, the process presents a variety of technical challenges for conventional MT systems. These technical challenges are further exacerbated when the translation tasks requires bi-directional translations—that is, a first translation of textual sequence in a source language to a textual sequence target language and also a second translation of another textual sequence from the target language back to the source language.

SUMMARY

The present disclosure relates to a machine translation system for bi-directional translation of textual sequences between at least two languages.

In a broad aspect, described herein are machine translation systems and methods for bi-directional translation of a textual sequence in a source language into a textual sequence (typically a sentence) in a target language.

In some examples, the present disclosure describes a machine translation system for bi-directional translation of textual sequences between a first language and a second language. The system includes: a first autoencoder configured to receive a vector representation of a first textual sequence in the first language and encode the vector representation of the first textual sequence into a first sentence embedding; a sum-product network (SPN) configured to receive the first sentence embedding and generate a second sentence embedding by maximizing a first conditional probability of the second sentence embedding given the first sentence embedding; and a second autoencoder configured to receive the second sentence embedding, and decode the second sentence embedding into a vector representation of a second textual sequence in the second language.

In some examples, the present disclosure describes a method for bi-directional translation of a textual sequence between a first language and a second language. The method includes: encoding, by a first autoencoder, a vector representation of a first textual sequence in the first language into a first sentence embedding; generating, by a sum-product network (SPN), a second sentence embedding by maximizing a first conditional probability of the second sentence embedding given the first sentence embedding; and decoding, by a second autoencoder, the second sentence embedding into a vector representation of a second textual sequence in the second language.

In some examples, the present disclosure describes a computer-readable medium having stored thereon machine-executable instructions. The instructions, when executed by a processing device of a system, cause the system to: encode, by a first autoencoder, a vector representation of a first textual sequence in the first language into a first sentence embedding; generate, by a sum-product network (SPN), a second sentence embedding by maximizing a first conditional probability of the second sentence embedding given the first sentence embedding; and decode, by a second autoencoder, the second sentence embedding into a vector representation of a second textual sequence in the second language.

In any of the above examples, the second autoencoder is also configured to encode the vector representation of the second textual sequence in the second language into the second sentence embedding; the SPN is also configured to generate the first sentence embedding by maximizing a second conditional probability of the first sentence embedding given the second sentence embedding; and the first autoencoder is also configured to decode the first sentence embedding into the vector representation of the first textual sequence in the first language.

In any of the above examples, the first autoencoder includes a first encoder and a first decoder, and the second autoencoder includes a second encoder and a second decoder. Each of the first encoder, first decoder, second encoder and second decoder may independently include: a recurrent neural network (RNN), a convolutional neural network (CNN), a deconvolutional neural network (D-CNN) or a transformer neural network.

In any of the above examples, the SPN may include a plurality of layers, and each layer may be independently formed by a plurality of sum-nodes or a plurality of product-nodes.

In any of the above examples, the first and second autoencoders may be trained together in a first training phase, to: at the first and second autoencoders, encode vector representations of first and second training textual sequences from the first and second languages, respectively, into respective first and second training sentence embeddings; at the first and second autoencoders, decode first and second training sentence embeddings into respective vector representations of first and second reconstructed textual sequences in the first and second languages, respectively; and adjust weights of the first and second autoencoders to minimize a loss function representing reconstruction losses between the first and second reconstructed textual sequences and the respective first and second training textual sequences.

In any of the above examples, the SPN may be trained in a second training phase, to: adjust weights of the SPN to maximize a joint probability of the first and second training sentence embeddings; and calculate maximized conditional probabilities using the joint probability.

In various examples, the present disclosure describes a sum-product network (SPN)-based system for bi-directional machine translation. In the disclosed examples, a single system is trained to perform translations from a first language to a second language, and also vice versa.

The example disclosed system includes two autoencoders, each of which is trained on one of the two languages. The autoencoders each enable mapping of a latent code space representing sentence embeddings in each respective language. The SPN may then be trained to compute the joint probability distribution between the two languages in the latent code space. The joint probability distribution may be used to calculate conditional probabilities that enable bi-directional translation.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

As noted above, various Machine Translation (MT) systems employ Neural Machine Translation (NMT) techniques that use sequence-to-sequence learning to learn a model to predict a target language textual sequence given a source language textual sequence. The model is learned by training artificial neural networks arranged in an encoder-decoder architecture. The artificial neural networks arranged in an encoder-decoder architecture may include Recurrent Neural Networks (RNN) that respectively act as an "encoder" and a "decoder". For example, a textual sequence in a first language (e.g., English) is mapped to a textual sequence in a second language (e.g., Spanish) by virtue of the artificial neural networks that are arranged in an encoder-decoder architecture.

With this encoder-decoder architecture, the encoder may be implemented as a RNN that is trained to learn to map a source textual sequence of the first language into a representation that captures the meaning of the source textual sequence in a latent code space. In turn, the decoder may also be implemented as a RNN trained to learn to map the representation provided by the latent code space into the target textual sequence in the second language. Although the present disclosure describes where the encoder and decoder are both implemented as trained RNNs, it should be understood that the encoder and decoder may be implemented using other types of neural networks. For example, the encoder may be implemented as a convolutional neural network (CNN) and the decoder may be implemented a deconvolutional neural network (D-CNN), or the encoder and the decoder may each be implemented as a Transformer neural network, for example. In this manner, a MT system can be trained to learn to effectively translate phrases, and sentences from a first language to a second language, based on the learned representations in the latent code space.

It will be appreciated, however, that the training process for conventional RNN-based MT systems (i.e. MT systems that have an encoder-decoder architecture in which the encoder and decoder are RNNs) have proven to be complex and/or inefficient to train (e.g., requiring frequent retuning of hyper-parameters of the RNN, requiring large amounts of training data (such as labeled data which includes pairs of source text and corresponding translated text), occupying processing resources and time, etc.). In addition, RNN-based MT system processes are not readily amenable to parallelization techniques.

Moreover, most RNN-based MT systems are trained to learn to perform translations of textual sequences from a first language to a second language—but not vice-versa. In other words, usually RNN-based MT system provide translations in one direction from a first language to a second language and not in the reverse direction (i.e., from the second language to the first language). Therefore, in circumstances in which translations of textual content/sentences are required in the reverse direction (i.e., from the second language to the first language), a separate RNN might be required to be independently trained and configured to perform the translations of textual content/sentences in the reverse direction.

Machine Translations Employing Shared Latent Code Spaces

Recently, a model has been proposed that may be viable in performing bi-directional translations with some degree of success. (See, e.g., Lample et al., "Unsupervised Machine Translation Using Monolingual Corpora Only," 2017, (hereinafter "Lample"), the contents of which are herein incorporated by reference). Lample discloses a model that extracts monolingual corpora attributes from unparalleled sentences in two different languages and uses the attributes to find and establish a common or "shared" latent code space. The shared latent code space includes vector codes to which de-noised vector input sentence representations that have been produced by an encoder are mapped. Facilitated by the shared latent code space, the Lample model may then be trained to reconstruct sentences in a given language from noisy versions thereof, as well as to reconstruct a source sentence in one language given a noisy translation of the same sentence in the other language, and vice-versa.

However, it will be appreciated that in many instances, finding and establishing a shared latent code space between two languages of unparalleled sentences may not be achievable. This might be especially true in circumstances where the two languages are not from the same root language or do not share the same alphabet structure. It should also be appreciated that bi-directional MT operations facilitated by shared latent code spaces (such as proposed by Lample) may not adequately reflect or come close to achieving the capabilities of a skilled bilingual person. For example, a skilled bilingual person operates and translates as if being a native speaker of the two languages and is capable not only of translating sentences between the two languages bi-directionally, but also of accurately and efficiently expressing abstract nuances and contextual concepts in both languages.

Sum-Product Network (SPN) Language Model

Sum-Product Networks (SPNs) are a class of deep probabilistic models that have proven to provide a suitable framework for language modeling of speech recognition applications. SPNs include distribution leaves (as network inputs) accommodating interleaving layers of sum-nodes and product-nodes (as internal node or inner nodes), in which the sum-nodes operate as hidden variables and the product-nodes operate to capture interactions among SPN inputs. SPNs are capable of modeling complex dependencies among words and have built-in structured learning algorithms to maintain inference and training times relatively efficient and tractable.

In one existing proposed approach to SPN language modeling, the model is configured to find the conditional probability of a next word given the N preceding words, $p(w_{i-N}, \ldots, w_{i-1})$, to facilitate identifying complex dependencies among the words. (See, e.g., Wei-Chen Cheng, et al., "Language Modeling with Sum-Product Networks," 2014, (hereinafter "Cheng"), the contents of which are herein incorporated by reference). An exemplary representation of the language modeling architecture 100 proposed by Cheng is depicted in FIG. 1.

As shown, Cheng's proposed SPN language modeling architecture 100 comprises a representative construct of multiple layers 101-105 of sum-nodes (indicated by "+" symbol) and product-nodes (indicated by "x" symbol), in which layers 101-105 are interconnected by edges as shown. The sum-node/product-node layers 101-105 are each respectively configured to process the digital vector representations inputted from a lower layer and to forward resulting content to successive higher layers. The leaves of the SPN language modeling architecture 100 are distribution functions, each leaf being configured to provide un-normalized distribution of a random variable, in accordance with a probability distribution, such as, for example, Gaussian distribution or any suitable distribution capable of capturing and processing real vector values.

Figure 1:
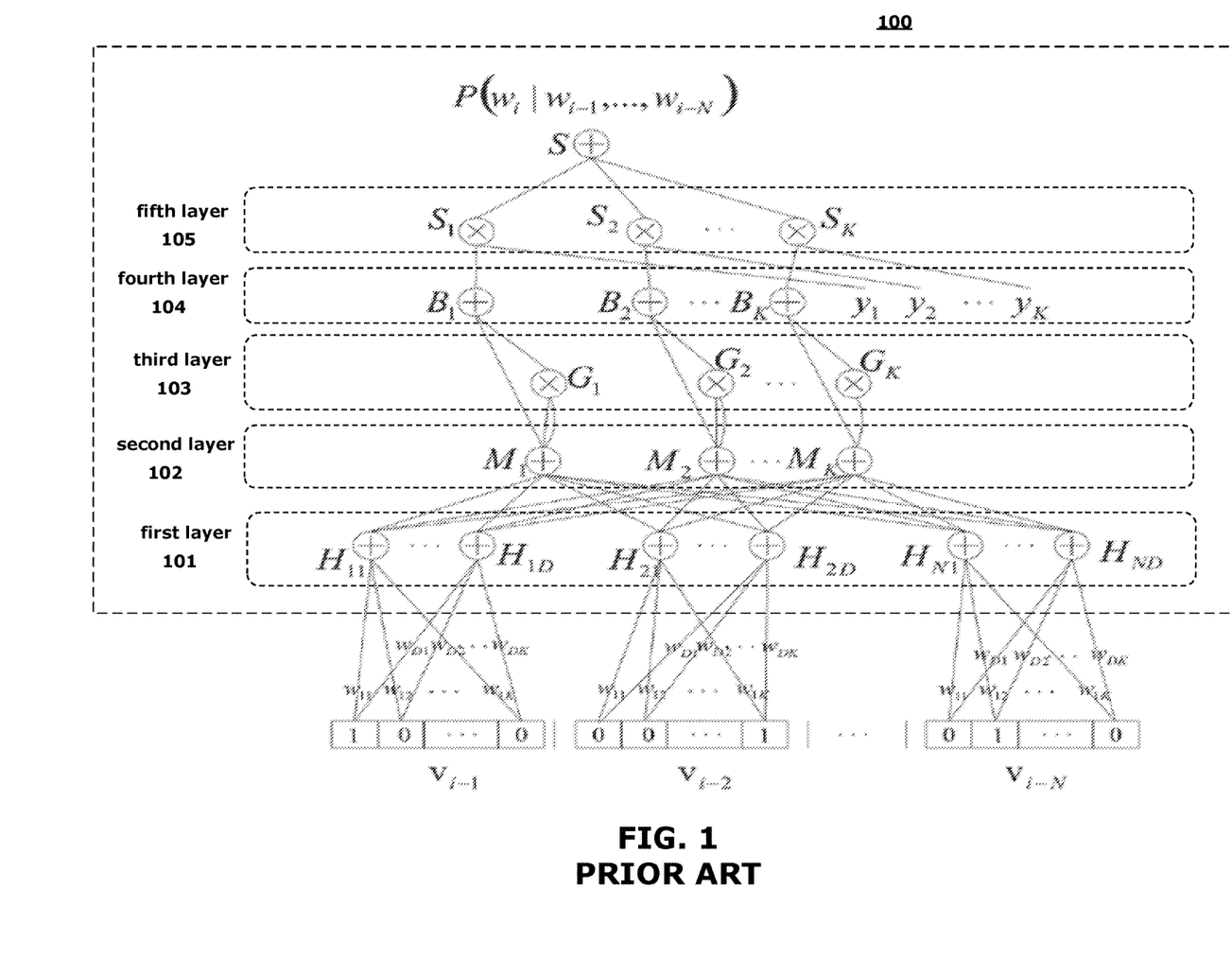
FIG. 1 depicts a high-level block diagram of an known architecture of a Sum-Product Network (SPN) for language modeling.

By way of example, as depicted in FIG. 1, the SPN language modeling architecture 100 receives a transformation of the one-hot vector representation of the N preceding words, $(V_{i-N}, \ldots, V_{i-1})$ via first layer 101. By one-hot vector, it is meant that the vector has the value "1" at the index corresponding to the word it represents, and the value "0" at all other indices. The input to the first layer 101 is a fully-connected convolutional layer that is configured to map the K dimensional one-hot representation of the N words of a sentence in a first language to a low dimensional hidden space $H_{i1:iD}$ having a size D, in which D<<K and K represents the number of words in a dictionary. In this scheme, the output of the first layer 101 percolates up through the sum-nodes and product-nodes of the second to fifth layers 102-105 and is subjected to their respective processes. After the fifth layer 105, the one-hot representation $y_i$ of the initial query word corresponding to the candidate word for $(w_i)$ (i.e., the variable $y_i$ has a value of "1" if the query is for the i-th word, and a value of "0" otherwise) is supplied to the final sum-node S to determine the conditional probability of the $i^{th}$ word in view of the previous N words, namely. Mathematically, the output of the SPN language modeling architecture is the value of the sum-node 5, which is the conditional probability $P(w_i|w_{i-N}, \ldots, w_{i-1})$.

The conditional probability information produced by the SPN language modeling architecture 100 is capable of identifying the long range dependencies of word sequences that may be utilized to provide the one-way translations of such word sequences for speech recognition applications.

SPN-Based Bi-Directional Language Translation System

As noted above, known MT shared latent code space methods have certain drawbacks relative to the bi-directional translations of content provided by unparalleled word sequences. Equally notable, while known SPN language modeling methods are capable of determining conditional probabilities of word sequences to effect one-way translations, they do not address bi-directional translations of word sequences or sentence content.

With this said, in at least one broad aspect, the systems and methods disclosed herein exploit, improve upon, and combine certain features of shared latent code space methods and SPN language modeling methods to achieve an SPN-based bi-directional translation system. In the present disclosure, a bi-directional translation system means a single machine translation system that is capable of translating textual sequences from a first language to a second language (a first direction of translation) and also translating textual sequences from the second language to the first language (a second direction of translation that is the opposite to the first direction). In both directions of translation, the meaning and context of the textual sequence is the same in both languages. A textual sequence, in the present disclosure, is a sequence of words that form a phrase or sentence, in which meaning and content is at least partially derived from the order of the words in the sequence.

Figure 2A:
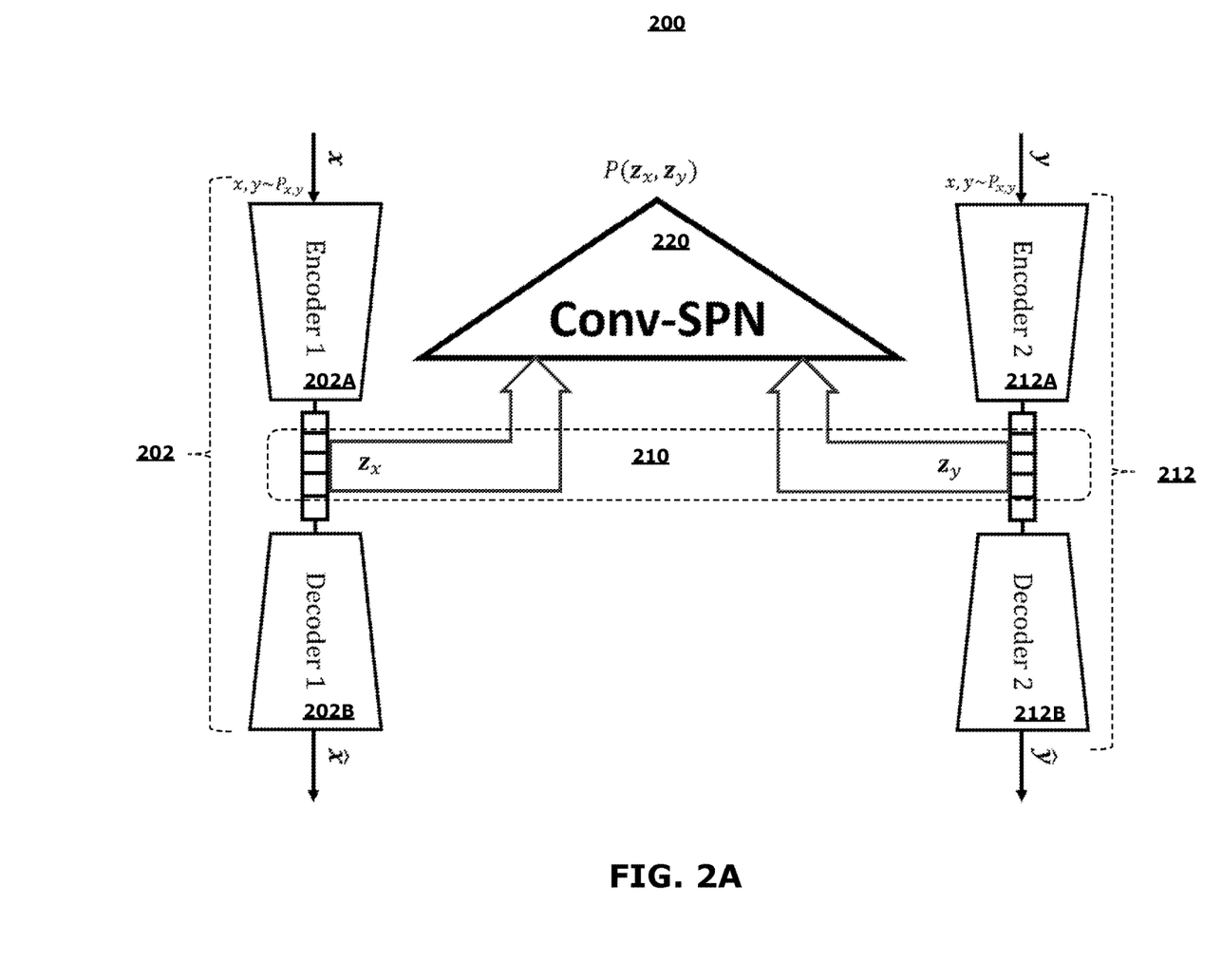
FIG. 2A depicts a high-level functional block diagram of an example SPN-based bi-directional translation system, in accordance with the non-limiting embodiments provided by the present disclosure.

In particular, FIG. 2A depicts a high-level block diagram of an example SPN-based bi-directional translation system 200, in accordance with the non-limiting embodiments provided by the present disclosure. As shown, SPN translation system 200 employs a first auto-encoder module 202 comprising a first encoder submodule 202A and a first decoder submodule 202B, a second auto-encoder module 212 comprising a second encoder submodule 212A and a second decoder submodule 212B, and an SPN module 220. It is to be understood, however, that depicted SPN translation system 200 is merely an illustrative implementation of the present disclosure. Thus, the ensuing descriptions are intended to only be a description of illustrative examples of the present disclosure to aid in understanding of the disclosed features and concepts, and are not intended to define the scope or set forth the bounds of the present disclosure.

Given the depicted structure of SPN translation system 200, SPN module 220 operates on the latent code space 210

(i.e., the set of all feasible sentence embeddings corresponding to the two languages L1, L2) supplied by first and second auto-encoder modules 202, 212 to compute the joint probability distribution of the sentence embeddings of the two languages P(L1, L2). The joint probability distribution P(L1, L2) may be stored in a memory (not shown in FIG. 2A) of the SPN translation system 200. In turn, joint probability distribution P(L1, L2) may be used to compute the conditional latent code space probability of each language given the other, namely, P(L1|L2) and P(L2|L1), and these probabilities may also be stored in a memory of the SPN translation system 200. Generally, sentence embedding refers to various techniques that may be used to represent a textual sequence as a representational vector of real numbers. The representational vector of real numbers outputted by a sentence embedding technique may also be referred to as "sentence embedding". The distance between two sentence embeddings indicate the similarity (e.g., similarity in semantic meaning or similarity in narrative concept) between the two textual sequences represented by the sentence embeddings. Specifically, the closer the distance between two sentence embeddings, the greater the similarity between the two represented textual sequences. It should be noted that although the present disclosure uses the term "sentence embedding", the textual sequence represented by a sentence embedding is not necessarily a sentence (as defined by grammar). For example, the textual sequence represented by a sentence embedding may also be a phrase, a clause, a group of words, a single word or any other textual sequence having some semantic meaning.

Using conditional probabilities P(L1|L2), P(L2|L1), SPN translation system 200 operates to achieve bi-directional translations for both languages by applying the resulting sentence embeddings supplied by first and second auto-encoder modules 202, 212 through corresponding first and second decoder submodules 202B, 212B.

Returning to FIG. 2A, the general functional flow of the system 200 is illustrated. In particular, a sampled textual sequence x, is inputted to the trained first auto-encoder module 202. In this example, textual sequence x is in a first language L1. For example, textual sequence x may be a sentence from a text corpus. Generally, a text corpus is a collection of text (including words, phrases, sentences and/or entire documents). A monolingual text corpus contains text in only one language; a multilingual text corpus contains text in two or more languages that are all translations of the same text (and typically configured such that translations corresponding to the same textual sequence can be aligned or matched together). The first auto-encoder module 202 is configured to receive the textual sequence x as input into the trained first encoder submodule 202A, to generate a sentence embedding $z_x$ corresponding to textual sequence x and map the sentence embedding $z_x$ into a latent code space 210. Commensurately, a sampled textual sequence y (e.g., sampled from the same or different text corpus as textual sequence x) expressed in a second language L2 is inputted to the trained second auto-encoder module 212. The second auto-encoder module 212 is configured to receive the textual sequence y as input into the trained second encoder submodule 212A, to generate a sentence embedding $z_y$ of textual sequence y and map the sentence embedding $z_y$ into latent code space 210. As noted above, sentence embeddings $z_x$, $z_y$ represent characteristics of textual sequences x, y, such as words/phrases, that are transformed into a representational vector of real numbers (otherwise referred to as a digital vector codes, where the digital vector codes each have a predetermined number of bytes (e.g., 256 bytes, 512 bytes, etc.). The latent code space 210 is the set of all feasible sentence embeddings Z from both languages L1, L2. The latent code space 210 is defined as the space of all potential sentence embeddings Z. The latent code space 210 is a space that is generated by the encoder submodule 202A, 212A of each auto-encoder module 202, 212. Conceptually, in the context of translation, the latent code space 210 may be thought of as a map of the semantic meaning or underlying structure of the sentence embeddings $z_x$, $z_y$. Generally, the latent code space 210 is hidden (or latent) and not directly observable.

The latent code space 210 is not necessarily shared or common to both auto-encoder modules 202, 212. Each encoder submodule 202A, 212A may generate its own respective latent code space 210 which may or may not overlap with each other. FIG. 2C shows an example of the system 200, similar to that of FIG. 2A. However, instead of a single latent code space 210 shared between both auto-encoder modules 202, 212, the first encoder submodule 202A of the first auto-encoder module 202 is configured to receive the textual sequence x as input into the trained first encoder submodule 202A, to generates sentence embedding $z_x$ corresponding to textual sequence x and map sentence embedding $z_x$ to a first latent code space 210A, and the second encoder submodule 212A of the second auto-encoder module 212 is configured to receive the textual sequence y as input into the trained second encoder submodule 212A, to generate a sentence embeddings $z_y$ of textual sequence y and map the sentence embedding $z_y$ into latent code space 210B. It should be noted that the two latent code spaces 210A, 210B may be completely independent from each other (as shown) or may partially overlap. Operation of the system 200 is not dependent whether the latent code space is shared (e.g., latent code space 210 as shown in FIG. 2A), independent (e.g., latent code spaces 210A, 210B as shown in FIG. 2C), or overlapping. For simplicity, the present disclosure refers to the latent code space 210 in the singular, however it should be understood that this is not intended to be limiting and there may be two latent code spaces 210A, 210B.

The sentence embeddings $z_x$, $z_y$ are vectors of real numbers that are samples from (e.g. elements or items) of the latent code space 210. The sentence embeddings $z_x$, $z_y$ are inputted to SPN module 220. As noted above, SPN module 220 operates to compute the joint probability distribution $P(z_x, z_y)$ of sentence embeddings $z_x$ and $z_y$ for both languages L1, L2. Having computed the joint probability distribution $P(z_x, z_y)$, the conditional probabilities $p(z_y|z_x)$ and $p(z_x|z_y)$ may then be further computed by the SPN module 220 inferring a distribution over the target sentence embeddings given the source sentence embeddings and vice-versa. The sentence embeddings are then applied to the counterpart language decoder submodule to achieve the translation of the two languages bi-directionally.

SPN-Based Bi-Directional Language Translation System

Figure 2B:
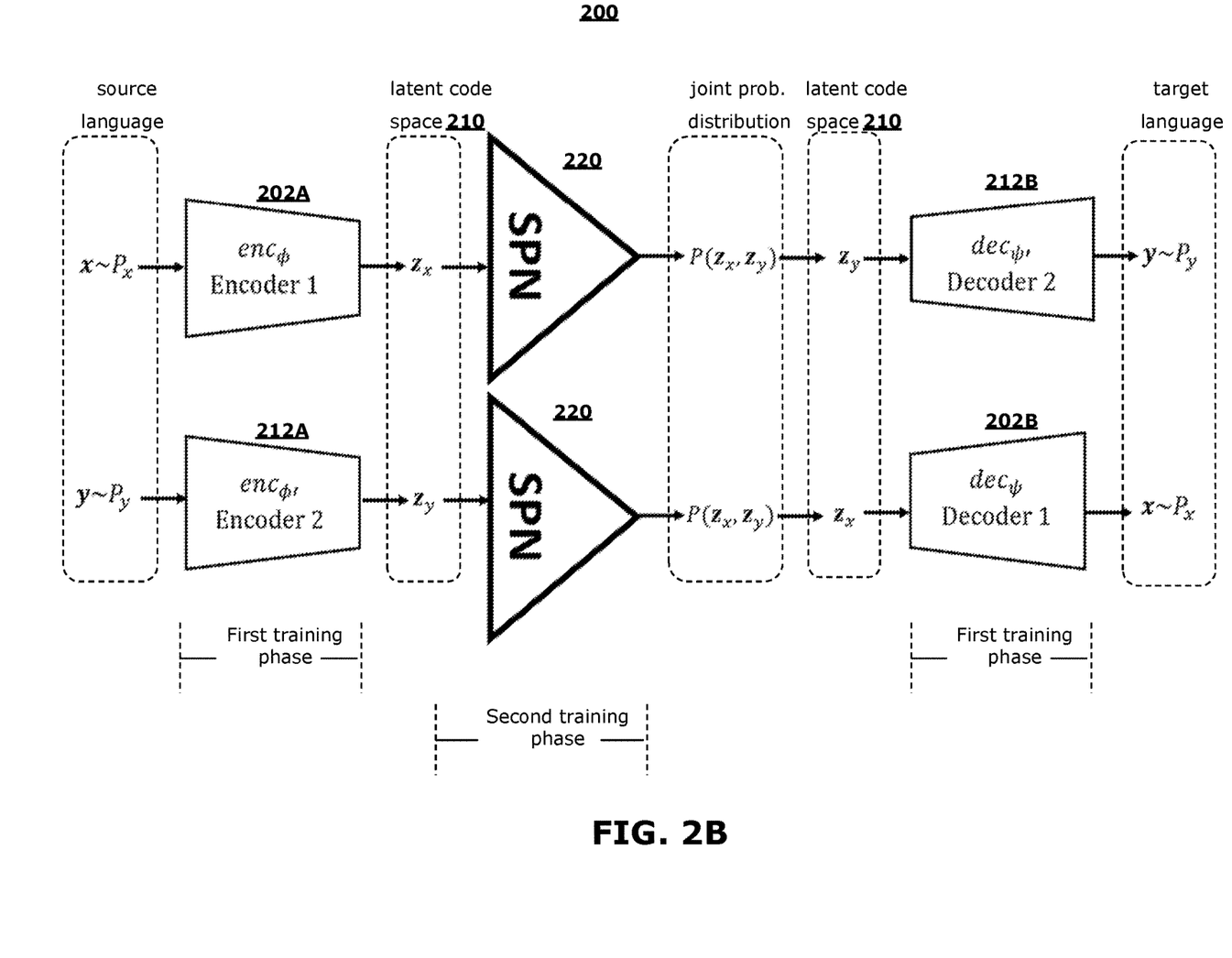
FIG. 2B depicts a detailed functional block diagram of the SPN-based bi-directional translation system of FIG. 2A, in accordance with the non-limiting embodiments provided by the present disclosure.
Figure 2C:
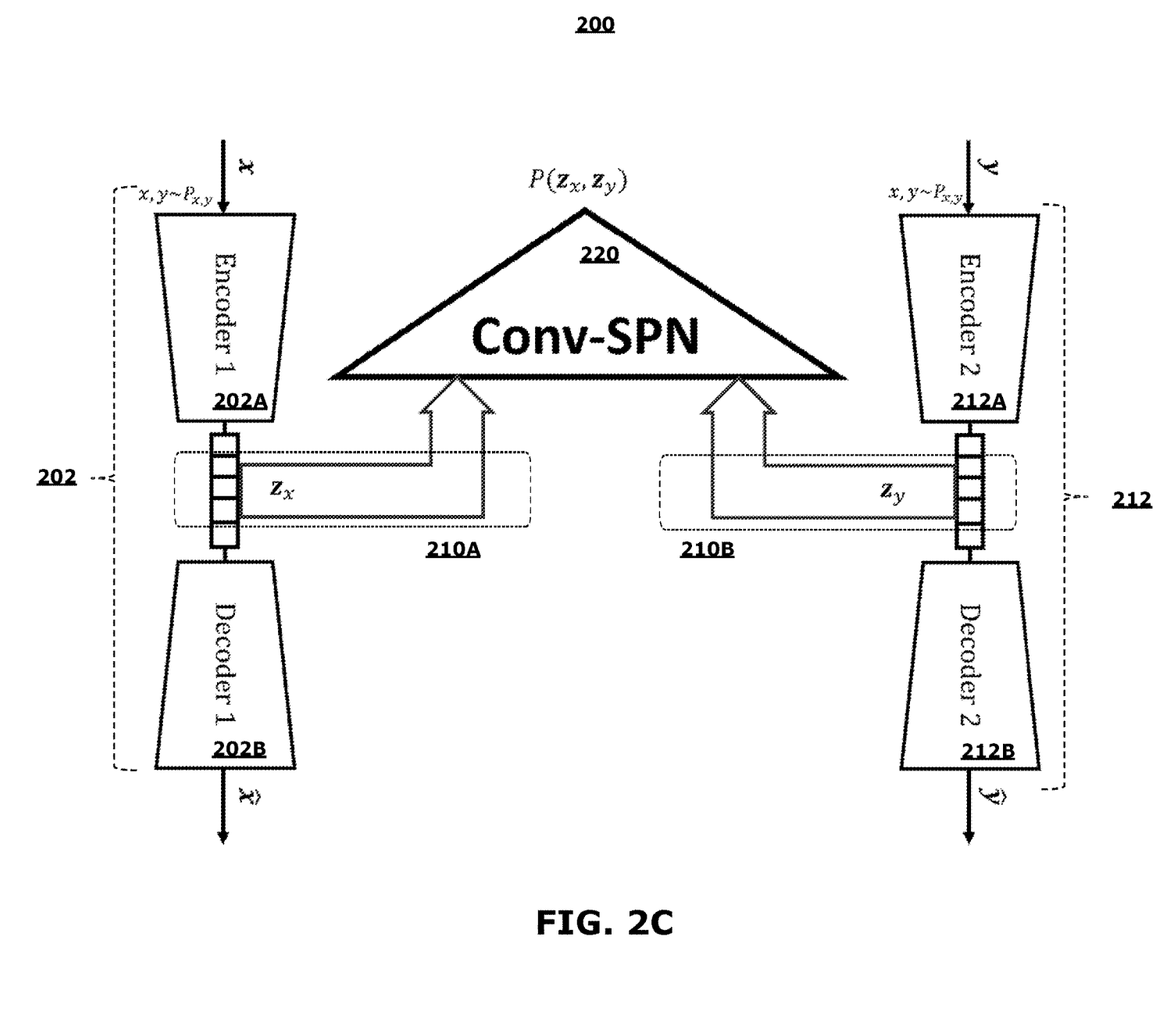
FIG. 2C depicts another example high-level functional block diagram of an example SPN-based bi-directional translation system, in accordance with the non-limiting embodiments provided by the present disclosure.

FIG. 2B illustrates a detailed functional block diagram of the SPN-based bi-directional translation system 200, in accordance with the non-limiting embodiments provided by the present disclosure. The first and second auto-encoder modules 202, 212 may be trained using any suitable machine-learning techniques. For example, each auto-encoder module 202, 212 may be trained using an unsupervised machine-learning algorithm in order to learn the respective parameters (e.g., weights) of the neural networks (e.g., RNNs, CNN and D-CNN or Transformer neural networks) that implement the respective auto-encoder module 202, 212. In certain contemplated embodiments, the SPN-based bi-directional translation system 200 may be trained in two phases, as indicated by FIG. 2B. That is, during a first training phase, first and second auto-encoder modules 202, 212 (comprising associated first and second encoder submodules 202A, 212A and first and second decoder submodules 212A, 212B) are trained to learn the latent code space 210 comprising all feasible sentence embeddings $z_x$, $z_y$. During a second training phase, SPN module 220 is trained to learn the joint probability distribution $P(z_x,z_y)$ of sentence embeddings $z_x$ and $z_y$ for both languages in order to subsequently determine conditional probabilities $p(z_y|z_x)$ and $p(z_x|z_y)$ that facilitate bi-directional translations.

Consistent with the disclosed embodiments, during the first training phase, first auto-encoder module 202 may be trained by processing training samples comprising textual sequences in a first language L1 that are selected from a multilingual text corpus (e.g., text corpus including text in at least languages L1 and L2, which are translations of each other). Similarly, second auto-encoder module 212 may be trained by processing training samples comprising textual sequences in a second language L2 that are selected from the same multilingual text corpus. During the first training phase, the text sequences used to train first and second auto-encoder modules 202, 212 do not need to be aligned (i.e., the text sequences of the two languages L1, L2 do not need to be parallel or translations of each other).

As shown in FIG. 2B, each of the first and second encoder submodules 202A, 212A respectively receive an input of text sequences x, y in their corresponding languages L1, L2 in which each input text sequence x, y exhibits its own associated probability distribution $P_x$, $P_y$ relative to the multilingual text corpus. In some embodiments, each word/phrase of input text sequences x, y is represented as one-hot vectors, in which the vector has the value "1" at the index corresponding to the word/phrase it represents, and the value "0" at all other indices. The present disclosure describes one-hot vector representation as an example, however other suitable techniques may be used to process input text sequences x, y into a format that is acceptable to be inputted to the first and second submodules 202A, 212A. After receipt of the one-hot vector representations of the input text sequences x, y, first and second encoder submodules 202A, 212A process and encode the respective one-hot vector representations of the input text sequences x, y, to generate corresponding sentence embeddings $z_x$ and $z_y$. The encoding process can be done using any neural network that models a language processing model such as a RNN, CNN, or a Transformer neural network, among other possible neural network architectures. For example, in the case of using RNN-based MT systems, the one-hot representation of an input text sequences x, y are fed to the RNN after passing to a word embedding layer and the last hidden state of RNN may be outputted as the sentence embedding. Sentence embeddings $z_x$, $z_y$ are subsequently samples (i.e. elements or items) of latent code space 210. The sentence embeddings $z_x$, $z_y$ are then respectively supplied to SPN module 220. In the example of FIG. 2B, two instances of SPN module 220 are shown, each receiving a respective one of the sentence embeddings $z_x$, $z_y$ and outputting a respective joint probability distribution $P(z_x,z_y)$. Although illustrated as separate instances, it should be understood that a single instance of SPN module 220 may be used to output the joint probability distribution $P(z_x,z_y)$ from inputted sentence embeddings $z_x$, $z_y$. As will be described in greater detail below, during the second training phase, SPN module 220 is trained to process sentence embeddings $z_x$, $z_y$ to determine a joint probability distribution $P(z_x,z_y)$.

In addition, during the first training phase, first and second decoder submodules 202B, 212B operate to receive the sentence embeddings $z_x$, $z_y$ generated by encoder submodules 202A, 212A and predict a representative reconstruction of sentence embeddings $z'_y$, $z'_x$. The first and second decoder submodules 202B, 212B may comprise any RNN, D-CNN or Transformer neural network, for example, among other possible neural network architectures. In the case of the RNN-based decoder (e.g. a decoder implemented using an RNN), the sentence embedding may be fed to the first time step of the RNN, and then the corresponding updated hidden state and the predicted word from that time step may be obtained. The updated hidden states and the predicted word from each time step may be fed to the next recursive block (such as an RNN unit of the RNN) until the end-of-sentence symbol is reached, which signals that the recursive decoding process should be terminated. The decoder submodules 202B, 212B may be configured to output a "softmax" representation of sentence embeddings $z_x$, $z_y$ at each time step. The softmax representation is a vector-based probability distribution of relevant dictionary words for the corresponding languages L1, or L2. The values of the softmax representation are configured to sum up to one (such that the values in the softmax representation represent the probability of each word relative to all the words represented in the softmax vector) and the dictionary words include words in each of the two different languages L1, L2. This softmax representation thus represents the probability distribution of words in the dictionary to appear in that corresponding time step.

It will be appreciated that in certain embodiments, auto-encoder modules 202, 212 (comprising constituent encoder/decoder submodules 202A/202B, 212A/212B) may be implemented by employing RNNs. In alternative contemplated embodiments, first and second encoder submodules 202A, 212A may be implemented as CNNs, while first and second decoder submodules 202B, 212B may be implemented as de-convolutional neural networks (DNNs).

It will further be appreciated that any differences between the input one-hot vector representations of text sequences x, y, and the corresponding reconstructed output $\hat{x}$, $\hat{y}$ (see FIG. 2A) from decoder submodules 202B, 212B may be quantified as "reconstruction losses". In various contemplated embodiments, reconstruction losses may be minimized by implementing a "loss function" directed to optimizing the training processes of first and second auto-encoder modules 202, 212. The loss function may embody, for example, iterative gradient descent variant techniques that monitor the correlations between the input text sequences and the reconstructed output text sequences and provide iterative feedback data to adjust and fine-tune various parameters (e.g., weights) of the encoder and decoder neural networks. That is, first and second auto-encoder modules 202A, 212A may be iteratively trained to learn the latent code representations of text sequences in the latent code space 210 until the quantified loss values, as determined by the loss function, are reduced to a degree where the quality of the reconstructed outputs $\hat{x}$, $\hat{y}$ substantially resemble input text sequences x,y to an acceptable, predetermined threshold level.

Upon achieving such acceptable levels during training, sentence embeddings $z_x$, $z_y$ are used as input samples of latent code space 210 for translation processing by SPN module 220. As such, trained first and second auto-encoder modules 202, 212 may then be capable of generating separate sentence embeddings $z_x$, $z_y$ for both languages L1, L2.

Figure 3A:
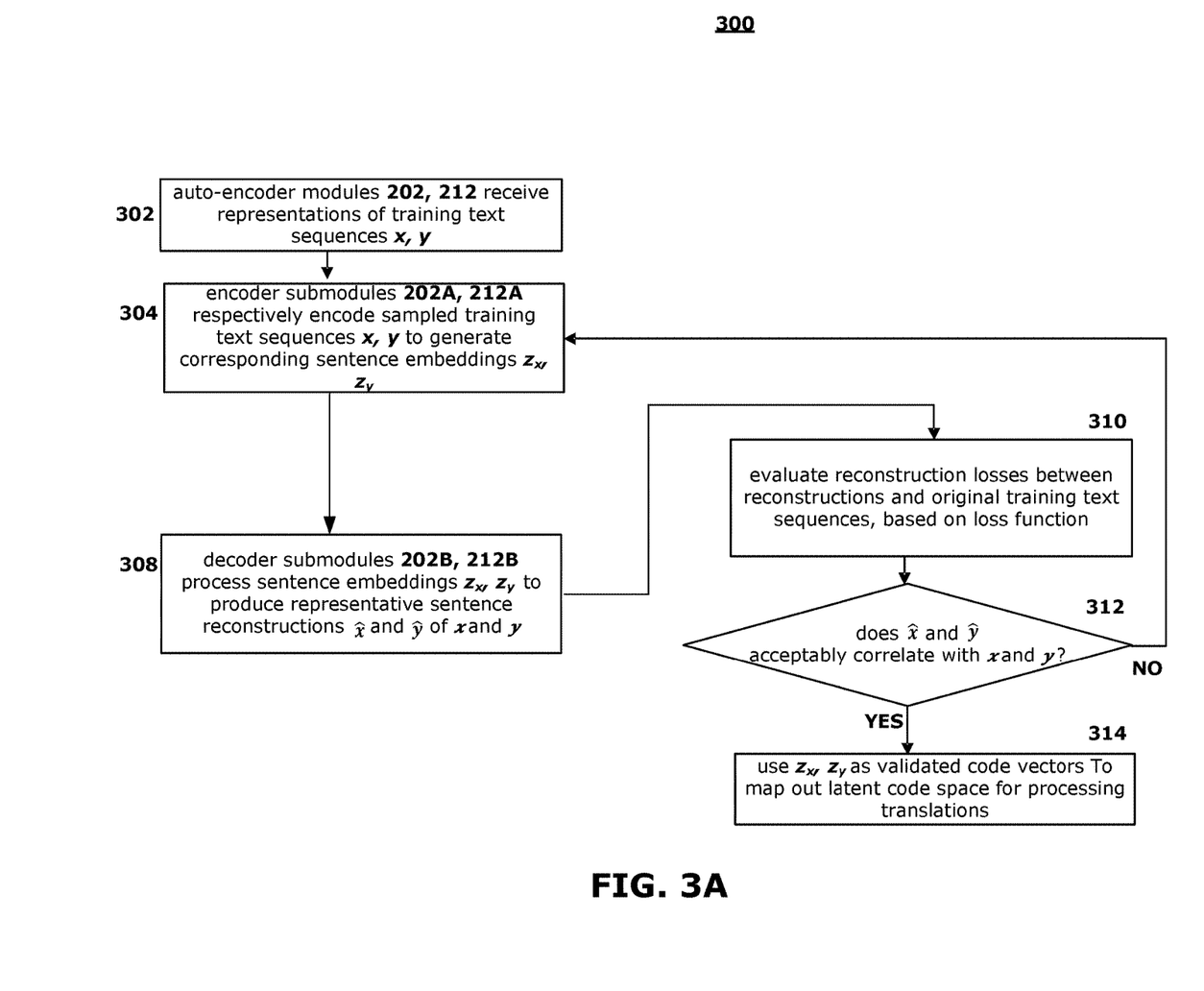
FIG. 3A depicts a flow diagram representing an exemplary process for training autoencoder modules of the SPN-based bi-directional translation system of FIG. 2A, in accordance with the non-limiting embodiments provided by the present disclosure.

FIG. 3A depicts a high-level flow diagram representing an exemplary process 300 for the first training phase of SPN-based bi-directional translation system 200, for training of auto-encoder modules 202, 212, in accordance with the non-limiting embodiments provided by the present disclosure. It will be appreciated that process 300 tasks may be performed by one or more computing devices or entities and may be embodied in computer-executable instructions that are stored in a computer-readable medium, such as a non-transitory computer-readable medium. Some acts, tasks, or portions thereof may be changed, depending on the particular implementation, without departing from the scope of the instant disclosure.

Consistent with the first training phase disclosures noted above, process 300 commences at task block 302, where each of auto-encoder modules 202, 212 (comprising constituent encoder/decoder submodules 202A/202B, 212A/212B) respectively receive input training text sequences x, y, in which each of the training text sequences are in their corresponding languages L1, L2 and have their own associated probability distribution $P_x$, $P_y$ relative to a multilingual text corpus. In some examples, the text sequences x, y are randomly sampled from the multilingual text corpus.

At task block 304, encoder submodules 202A, 212A respectively process and encode each of the training text sequences x, y to generate corresponding sentence embeddings $z_x$ and $z_y$ that are in a vector format. The sentence embeddings $z_x$ and $z_y$ are samples (i.e. elements or items) of the latent code space 210.

At task block 308, first and second decoder submodules 202B, 212B sample sentence embeddings $z_x$ and $z_y$ from the latent code space 210 and process each sentence embedding to generate a representative reconstruction of the respective training text sequences x, y (referred to as reconstructed text sequences $\hat{x}$ and $\hat{y}$, respectively). As noted above, the decoding process may include applying a softmax or normalized exponential function (generally referred to as a "softmax" function) to the sentence embeddings over the entire vocabulary for each time step prediction of the output sentence for the two languages L1, L2.

At task block 310, process 300 determines the reconstruction losses between the reconstructed text sequences z and y and the original training text sequences x and y by applying a loss function to quantify whether reconstructed text sequences $\hat{x}$ and $\hat{y}$ substantially correlate with and resemble input text sequences x and y in accordance with acceptable, predetermined levels.

At decision block 312, process 300 determines whether reconstructed text sequences $\hat{x}$ and $\hat{y}$ substantially correlate with and resemble input text sequences x and y in accordance with acceptable, predetermined levels for the entire training set. If so (YES), process 300 advances to task block 314, in which sentence embeddings $z_x$, $z_y$ will be used as validated vector codes that map out the latent code space 210 for translation processing between the languages L1 and L2. If not (NO), process 300 returns back to task block 304 to continue training of encoder and decoder submodules 202A, 212A, 202B, 212B in accordance with iterative feed-back data to adjust and fine-tune various decoder parameters (e.g., weights) of the neural networks provided by loss function information.

Returning to FIG. 2B, as previously noted, the second training phase is directed to the training of the SPN module 220. As described above, the SPN module 220 comprises a sum-product network (SPN) that includes consecutive sum-node processing layers and product-node processing layers that are communicatively interconnected by edges. The SPN of the SPN module 220 is trained to learn a joint probability distribution over pairs of aligned (i.e., parallel) sentence embeddings $z_x$, $z_y$ relative to the two languages L1, L2, namely, $P(z_x, z_y)$.

The SPN module 220 may be configured to operate under Gaussian distributions or any other suitable probability distribution over the real vector-based values of sentence embeddings $z_x$, $z_y$. Moreover, the SPN module 220 may be constructed or generated, at least in part, by automatic structure learning algorithms for SPNs. Furthermore, SPN module 220 may incorporate any suitable elements having adjustable parameters, which may be iteratively adjusted during training. In this manner, the parameters of SPN module 220 may be iteratively adjusted during the second training phase to maximize the determination of the joint probability distribution of pairs of sentence embeddings $z_x$, $z_y$, $P(z_x, z_y)$, for an aligned multilingual text corpus of languages L1, L2.

As depicted in FIG. 2B, the pair of sentence embeddings $z_x$, $z_y$ generated by each of encoder submodules 202A, 212A are received by SPN module 220. During the second training phase, the joint probability distribution of the pair of sentence embeddings $z_x$, $z_y$ may be computed by two bottom-up pass-throughs of the SPN of the SPN module 220 processing layers. That is, during a first pass-through, SPN module 220 receives the input sentence embeddings $z_x$, $z_y$ and processes the input to compute an output that corresponds to an unnormalized probability. This output is obtained by computing each layer of sum nodes and product nodes according to the architecture of the SPN. After computing the unnormalized probability in the first pass-through, during a second pass-through, SPN module 220 initializes all the distribution leaves to an input value of "1", and again processes the input through each layer of sum nodes and product nodes, to output a normalization constant. It should be understood that initializing all the distribution leaves to an input value of "1" corresponds to integrating out all the random variables, thus the SPN is effectively computing the normalization constant in the second pass-through. The normalized probability of the embeddings $z_x$, $z_y$ is then computed by dividing the unnormalized probability by the normalization constant.

Furthermore, much like the first training phase of the first and second auto-encoder modules 202, 212 noted above, SPN module 220 may be trained during the second training phase by maximizing the joint probability distribution $P(z_x, z_y)$. This maximization may employ any iterative training or learning approach capable of iteratively adjusting the parameters (i.e., weights) of the SPN of the SPN module 220, such as, for example, gradient ascent techniques, expectation maximization techniques, Bayesian moment matching techniques, collapsed variational Bayesian techniques, etc. In so doing, the parameters (i.e., weights) of SPN of the SPN module 220 may be trained and adjusted in a manner that maximizes probability distribution $P(z_x, z_y)$.

After the maximized probability distribution $P(z_x, z_y)$ is established, conditional probabilities $p(z_y|z_x)$ and $p(z_x|z_y)$ may be derived from $P(z_x, z_y)$ by computing $p(z_y|z_x) = P(z_x, z_y)/\Sigma_{z_y} p(z_x, z_y)$ and $p(z_x|z_y) = P(z_x, z_y)/\Sigma_{z_x} P(z_x, z_y)$. Notably, by training the SPN module 220 to compute the joint probability distribution $P(z_x, z_y)$, conditional probabilities in both translation directions may be calculated. The conditional probability $p(z_y|z_x)$ (i.e., probability of $z_y$ given $z_x$) represents the translation from sentence embedding $z_x$ to sentence embedding $z_y$ in the latent code space 210, and enables translation from text sequence x in language L1 to text sequence y in language L2. Similarly, conditional probability $p(z_x|z_y)$ (i.e., probability of $z_x$ given $z_y$) represents the translation from sentence embedding $z_y$ to sentence embedding $z_x$ in the latent code space 210, and enables translation from text sequence y in language L2 to text sequence x in language L1. Thus, training the single SPN module 220 enables bi-directional translation.

Figure 3B:
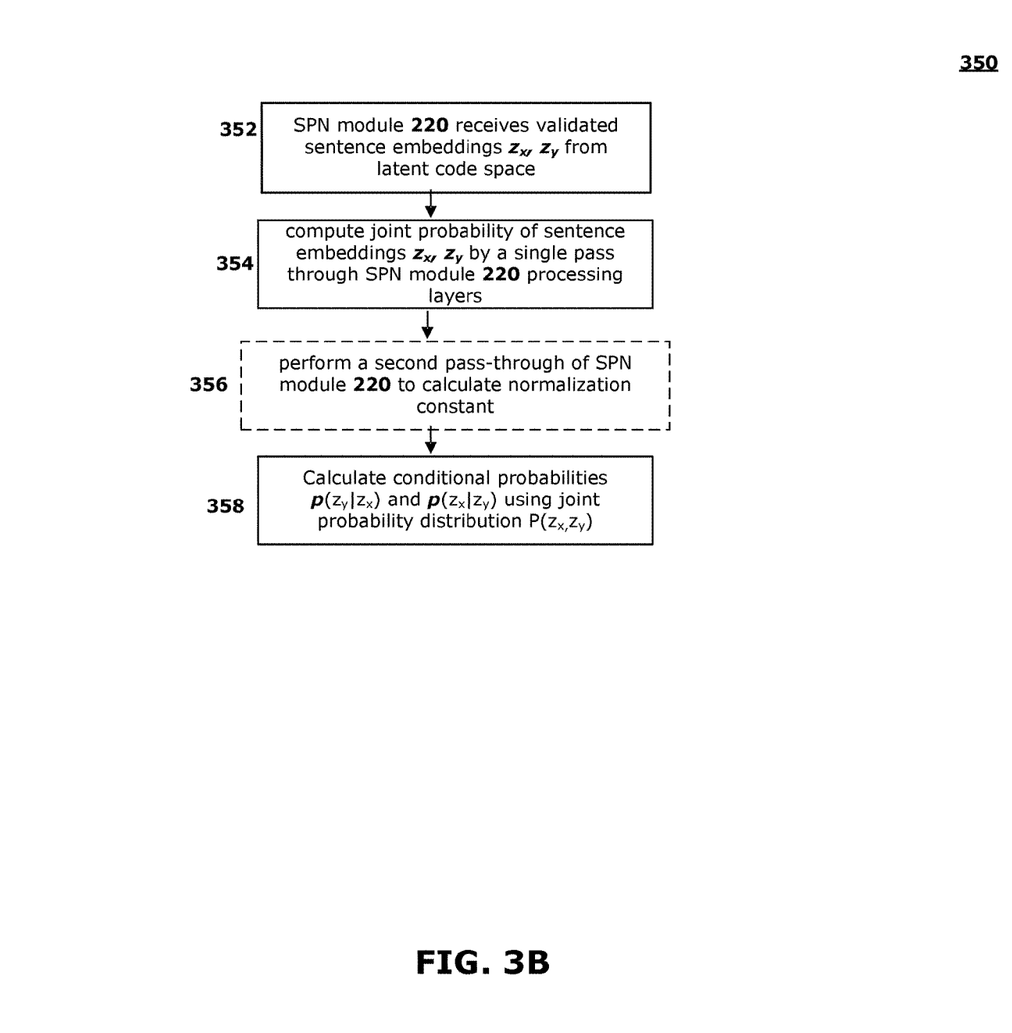
FIG. 3B depicts a flow diagram representing an exemplary process for training an SPN module of the SPN-based bi-directional translation system of FIG. 2A, in accordance with the non-limiting embodiments provided by the present disclosure.

FIG. 3B depicts a high-level flow diagram representing an exemplary process 350 for the second training phase of SPN-based bi-directional translation system 200, for training of SPN module 220, in accordance with the non-limiting embodiments provided by the present disclosure. It will be appreciated that process 350 tasks may be performed by one or more computing devices or entities and may be embodied in computer-executable instructions that are stored in a computer-readable medium, such as a non-transitory computer-readable medium. Some acts, tasks, or portions thereof may be changed, depending on the particular implementation, without departing from the scope of the instant disclosure.

Consistent with the second training phase disclosures noted above, process 350 commences at task block 352, where the pair of validated sentence embeddings $z_x$, $z_y$ (generated after the first training phase) are received by SPN module 220 from latent code space 210.

At task block 354, an unnormalized probability of sentence embeddings $z_x$, $z_y$ is computed during a bottom-up pass-through of the SPN module 220 processing layers.

Optionally, at task block 356, a second pass-through of the SPN module 220 is performed, with input values of the distribution leaves all set to "1", to calculate a normalization constant, as discussed above. Task block 356 may not be necessary if the normalization constant has already been computed (e.g., in a previous iteration of the training). The normalization constant is used to normalize the unnormalized probabilities computed at task block 354 described above. The unnormalized probability is divided by the normalization constant to obtain the normalized joint distribution $P(z_x, z_y)$.

At task block 358, conditional probabilities $p(z_y|z_x)$ and $p(z_x|z_y)$ are computed from the joint distribution $P(z_x, z_y)$, as explained above.

The process 350 may be repeated over multiple iterations, using different samples $z_x$, $z_y$ from the latent code space 210 to adjust the parameters (e.g. weights) of the SPN of the SPN module 220. For example, Hsu et al. (Hsu, W., Kalra, A. and Poupart, P. (2017) Online structure learning for sum-product networks with gaussian leaves. arXiv preprint arXiv: 1701.05265, incorporated herein by reference) describe an approach for learning the parameters (e.g., weights) in the layers of a SPN.

After having trained the auto-encoder modules 202, 212 and the SPN module 220, the trained SPN-based bi-directional translation system 200 may be used, in the inference phase, to perform bi-directional translation.

For example, given the sentence embedding $z_x$, the most likely sentence embedding $z_y*$ can be computed as: $z_y*=\text{argmax}_{z_y} p(z_y|z_x)$ that corresponds to the translated embedding of $z_x$. Similarly, given the sentence embedding $z_y$, the most likely sentence embedding $z_x*$ can be computed as $z_x*=\text{argmax}_{z_x} p(z_x|z_y)$ that corresponds to the translated embedding of $z_y$.

Figure 4:
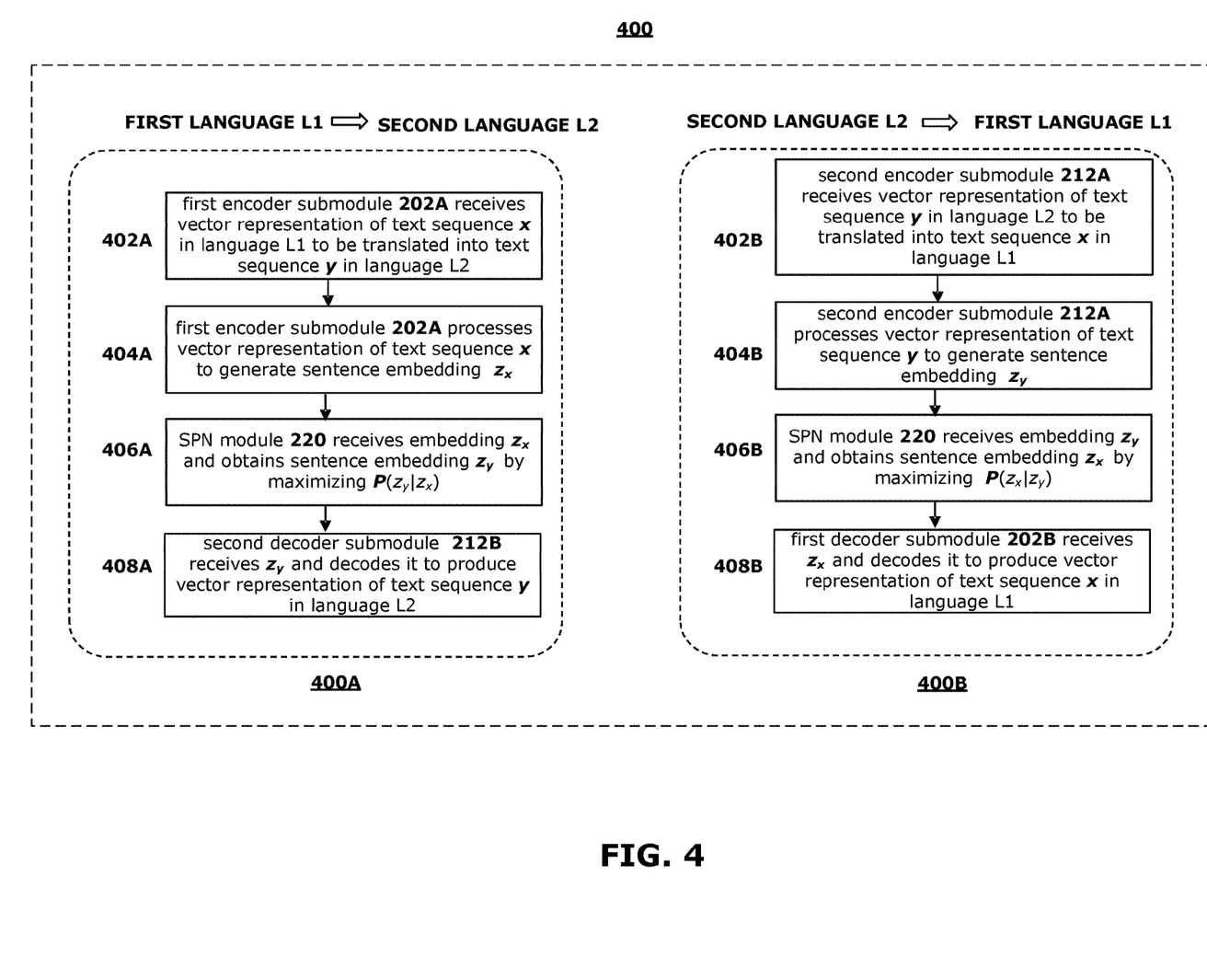
FIG. 4 depicts a high-level flow diagram representing an exemplary SPN-based bi-directional translation process that may be performed using the SPN-based bi-directional translation system of FIG. 2A, in accordance with the non-limiting embodiments provided by the present disclosure.

FIG. 4 depicts a high-level flow diagram representing an exemplary SPN-based bi-directional translation process 400, in accordance with the non-limiting embodiments provided by the present disclosure. It will be appreciated that process 400 is configured to operate in conjunction with at least some of the architectures, structures, and elements and associated functionality of disclosed above regarding SPN-based bi-directional translation system 200.

Moreover, for certain embodiments, it will be assumed that auto-encoder modules 202, 212 (comprising constituent encoder/decoder submodules 202A/202B, 212A/212B) have been trained to acceptably correlate (i.e., in accordance with predetermined threshold levels) sentence embeddings $z_x$, $z_y$ and reconstructed representations thereof $z'_x$, $z'_y$ that are based on text sequences x, y having corresponding languages L1, L2. Similarly, it is assumed that SPN module 220 has been trained to maximize the probability distribution $P(z_x, z_y)$ of aligned sentence embeddings to derive conditional probabilities $p(z_y|z_x)$ and $p(z_x|z_y)$.

With this said, FIG. 4 illustrates the bi-directional translation functionality of process 400 by demonstrating translations of text sequences from a first language L1 to a second language L2, noted by process 400A, as well as translations of text sequences from second language L2 to first language L1, noted by process 400B.

For the case of sentence translations from the first language L1 to the second language L2, as shown, process 400A commences at task block 402A, in which first encoder submodule 202A receives a vector representation (e.g., a one-hot vector representation) of text sequence x in a first language L1 that is to be translated into a text sequence y that is in a second language L2. At task block 404A, first encoder submodule 202A processes the vector representation of text sequence x to generate sentence embedding $z_x$ that is a sample in latent code space 210.

At task block 406A, SPN module 220 receives sentence embedding $z_x$ and operates to obtain corresponding sentence embedding $z_y$ by maximizing the conditional probability $P(z_y|z_x)$. The maximization of $P(z_y|z_x)$ may be achieved by applying, for example, gradient ascent techniques with respect to sentence embedding $z_y$, and may be represented as: $z_y*=\text{argmax}_{z_y} P(z_y|z_x)$.

Then, finally, at task block 408A, second decoder submodule 212B receives sentence embedding $z_y$ and decodes $z_y$ to generate a vector representation (e.g., one-hot vector representation) of text sequence y in second language L2. Further processing may be performed to convert the vector representation of text sequence y into textual representation.

Similarly, for the case of sentence translations from second language L2 to first language L1, process 400B commences at task block 402B, in which second encoder submodule 212A receives a vector representation (e.g., one-hot vector representation) of text sequence y in second language L2 that is to be translated into text sequence x that is in first language L1. At task block 404B, second encoder submodule 212A processes text sequence y to generate sentence embedding $z_y$ that is a sample in latent code space 210.

At task block 406B, SPN module 220 receives sentence embedding $z_y$ and operates to obtain corresponding sentence embedding $z_x$ by maximizing the conditional probability $P(z_x|z_y)$. The maximization of $P(z_x|z_y)$ may be achieved by applying, for example, gradient ascent techniques with respect to sentence embedding $z_x$, and may be represented as: $z_x*=\text{argmax}_{z_x} P(z_x|z_y)$.

Then, finally, at task block 408B, first decoder submodule 202B receives sentence embedding $z_x$ and decodes $z_x$ to generate a vector representation of text sequence x in first language L1. Further processing may be performed to convert the vector representation of text sequence x into textual representation.

Figure 5:
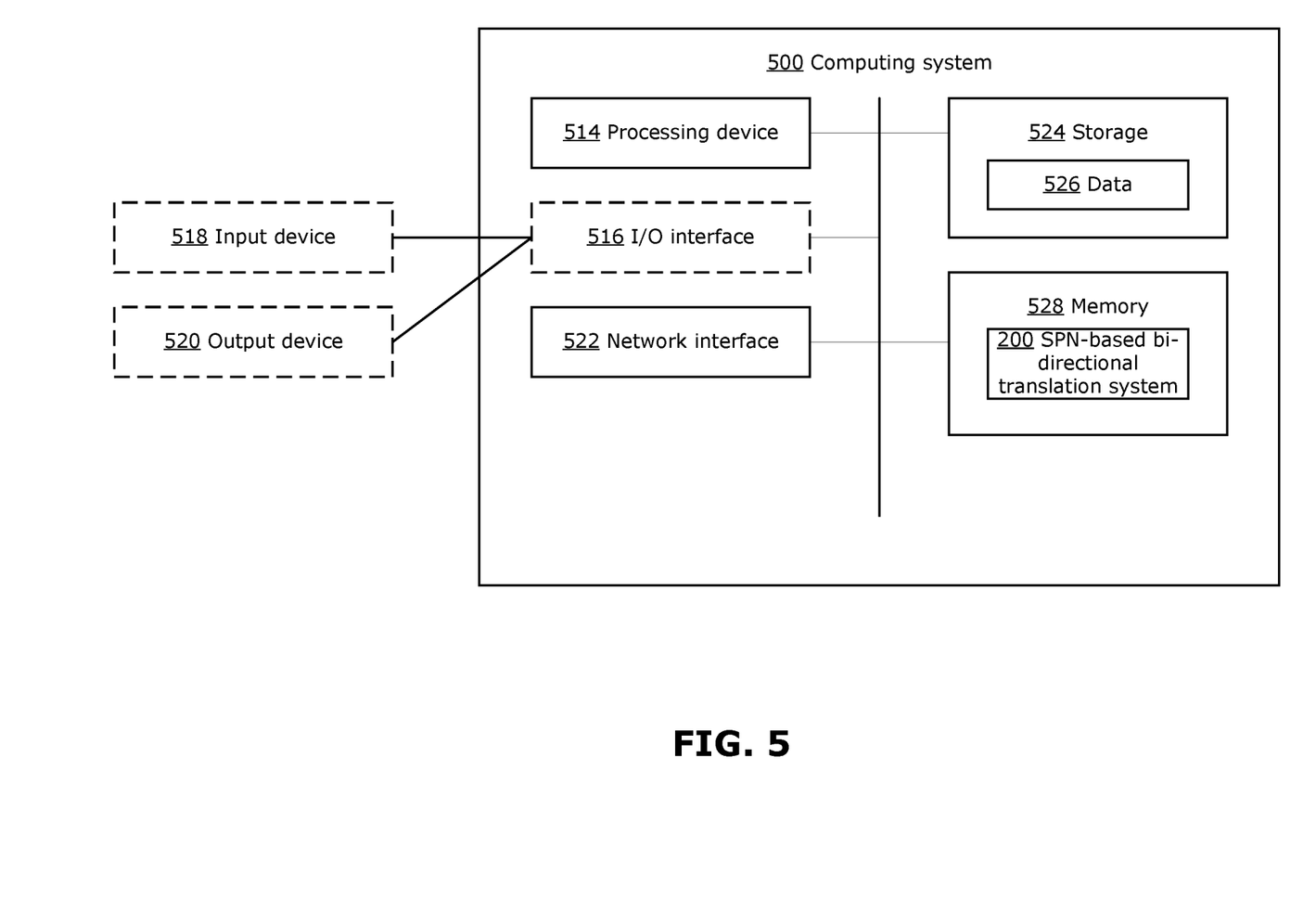
FIG. 5 is a simplified block diagram of an example computing system that may be used to implement the SPN-based bi-directional translation system of FIG. 2A.

FIG. 5 is a simplified block diagram of an example computing system that may be used to implement the SPN-based bi-directional translation system and methods disclosed herein. Other examples suitable for implementing embodiments described in the present disclosure may be used, which may include components different from those discussed below. Although FIG. 5 shows a single instance of each component, there may be multiple instances of each component in the computing system 500.

The computing system 500 may include one or more processing devices 514, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The computing system 500 may also include one or more optional input/output (I/O) interfaces 516, which may enable interfacing with one or more optional input devices 518 and/or optional output devices 520.

In the example shown, the input device(s) 518 (e.g., a keyboard, a mouse, a microphone, a touchscreen, and/or a keypad) and output device(s) 520 (e.g., a display, a speaker and/or a printer) are shown as optional and external to the computing system 500. In other examples, there may not be any input device(s) 518 and output device(s) 520, in which case the I/O interface(s) 516 may not be needed.

The computing system 500 may include one or more network interfaces 522 for wired or wireless communication with a communications network. The network interface(s) 522 may include wired links (e.g., Ethernet cable) and/or wireless links (e.g., one or more antennas) for intra-network and/or inter-network communications.

The computing system 500 may also include one or more storage units 524, which may include a mass storage unit such as a solid state drive, a hard disk drive, a magnetic disk drive and/or an optical disk drive. The storage unit(s) 524 may store data 526. For example, stored data 526 may include textual sequences to be processed by or used as training data by the SPN-based bi-directional translation system 200.

The computing system 500 may include one or more memories 528, which may include a volatile or non-volatile memory (e.g., a flash memory, a random access memory (RAM), and/or a read-only memory (ROM)). The non-transitory memory(ies) 528 may store instructions for execution by the processing device(s) 514, such as to carry out examples described in the present disclosure. The memory(ies) 528 may include other software instructions, such as for implementing an operating system and other applications/functions. In some examples, the memory(ies) 528 may include software instructions for execution by the processing device 514, to implement the SPN-based bi-directional translation system 200 (e.g., instructions to perform the processes 300, 350, 400A and/or 400B). In some examples, the computing system 500 may additionally or alternatively execute instructions from an external memory (e.g., an external drive in wired or wireless communication with the computing system 500) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The computing system 500 may also include a bus providing communication among components of the computing system 500, including those components discussed above. The bus may be any suitable bus architecture including, for example, a memory bus, a peripheral bus or a video bus.

Thus, by virtue of the disclosed embodiments, the described systems, architecture, and methods achieve bi-directional translations of sentences in two different languages that overcome at least some of the limitations and deficiencies of conventional machine translation systems and methods.

In various examples, the present disclosure provides methods and systems enabling bi-directional translation, using a SPN-based approach. The SPN is used to calculate joint probability distributions in a latent code space, to enable calculation of conditional probabilities which are used to perform bi-directional translations.

The latent code space may be mapped using auto-encoders to convert text sequences into sentence embeddings. After the SPN has been trained to output maximized joint probability distributions, the decoder submodule of the trained auto-encoder may be used to obtain a translation by decoding a sentence embedding from the latent code space to a text sequence in a desired target language.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A machine translation system for bi-directional translation of textual sequences between a first language and a second language, the machine translation system comprising:
   a first autoencoder including a first encoder and a first decoder, the first autoencoder receives a vector representation of a first textual sequence in the first language and is trained to encode, using the first encoder, the vector representation of the first textual sequence into a first sentence embedding;
   a sum-product network (SPN) configured to receive the first sentence embedding and generate a second sentence embedding by maximizing a first conditional probability of the second sentence embedding given the first sentence embedding, the SPN being configured to maximize the first conditional probability using a learned joint probability distribution of sentence embeddings for both the first language and the second language; and
   a second autoencoder, including a second encoder and a second decoder, the second autoencoder receives the second sentence embedding and the second autoencoder is trained to decode, using the second decoder, the second sentence embedding into a vector representation of a second textual sequence in the second language.

2. The system of claim 1, wherein:
   the second autoencoder is further trained to encode, using the second encoder, the vector representation of the second textual sequence in the second language into the second sentence embedding;
   the SPN is further configured to generate the first sentence embedding by maximizing a second conditional probability of the first sentence embedding given the second sentence embedding, the SPN being configured to maximize the second conditional probability using the learned joint probability distribution; and
   the first autoencoder is further trained to decode, using the first decoder, the first sentence embedding into the vector representation of the first textual sequence in the first language.

3. The system of claim 1, wherein each of the first encoder, the first decoder, the second encoder and the second decoder independently comprises: a recurrent neural network (RNN), a convolutional neural network (CNN), or a transformer neural network.

4. The system of claim 1, wherein the SPN comprises a plurality of layers, each layer independently formed by a plurality of sum-nodes or a plurality of product-nodes.

5. The system of claim 1, wherein the first and second autoencoders are trained together in a first training phase, to:
   at the first and second autoencoders, encode vector representations of first and second training textual sequences from the first and second languages into respective first and second training sentence embeddings;
   at the first and second autoencoders, decode first and second training sentence embeddings into respective vector representations of first and second reconstructed textual sequences in the first and second languages; and
   adjust parameters of the first and second autoencoders to minimize a loss function representing reconstruction losses between the first and second reconstructed textual sequences and the respective first and second training textual sequences.

6. The system of claim 5, wherein the SPN is trained in a second training phase, to:
   learn the learned joint probability distribution by adjusting weights of the SPN to maximize a joint probability of the first and second training sentence embeddings; and
   compute maximized conditional probabilities using the joint probability.

7. A computer-implemented method for bi-directional machine translation of a textual sequence between a first language and a second language, the method comprising:
   encoding, by a first encoder of a first autoencoder, a vector representation of a first textual sequence in the first language into a first sentence embedding, the first autoencoder including the first encoder and a first decoder;
   generating, by a sum-product network (SPN), a second sentence embedding by maximizing a first conditional probability of the second sentence embedding given the first sentence embedding, the SPN being configured to maximize the first conditional probability using a learned joint probability distribution of sentence embeddings for both the first language and the second language; and
   decoding, by a second decoder of a second autoencoder, the second sentence embedding into a vector representation of a second textual sequence in the second language, the second autoencoder including a second encoder and the second decoder.

8. The computer-implemented method of claim 7, further comprising:
   encoding, by the second encoder of the second autoencoder, a vector representation of a third textual sequence in the second language into a third sentence embedding;
   generating, by the SPN, a fourth sentence embedding by maximizing a second conditional probability of the fourth sentence embedding given the third sentence embedding, the SPN being configured to maximize the second conditional probability using the learned joint probability distribution; and
   decoding, by the first decoder of the first autoencoder, the fourth sentence embedding into a vector representation of a fourth textual sequence in the first language.

9. The computer-implemented method of claim 7, wherein each of the first encoder, the first decoder, the second encoder and the second decoder independently comprises: a recurrent neural network (RNN), a convolutional neural network (CNN), a deconvolutional neural network (D-CNN), or a transformer neural network.

10. The computer-implemented method of claim 7, wherein the SPN comprises a plurality of layers, each layer independently formed by a plurality of sum-nodes or a plurality of product-nodes.

11. The computer-implemented method of claim 7, further comprising, prior to the encoding and decoding, training the first and second autoencoders in a first training phase, the first training phase comprising:
   at the first and second autoencoders, encoding vector representations of first and second training textual sequences from the first and second languages into respective first and second training sentence embeddings;

at the first and second autoencoders, decoding first and second training sentence embeddings into respective vector representations of first and second reconstructed textual sequences in the first and second languages; and adjusting weights of the first and second autoencoders to minimize a loss function representing reconstruction losses between the first and second reconstructed textual sequences and the respective first and second training textual sequences.

12. The computer-implemented method of claim 11, further comprising, prior to the generating, training the SPN in a second training phase, the second training phase comprising:

learning the learned joint probability distribution by adjusting weights of the SPN to maximize a joint probability of the first and second training sentence embeddings; and calculating maximized conditional probabilities using the joint probability.

13. A non-transitory computer-readable medium having stored thereon machine-executable instructions that, when executed by a processing device of a system, cause the system to:

encode, by a first encoder of a first autoencoder, a vector representation of a first textual sequence in a first language into a first sentence embedding, the first autoencoder including the first encoder and a first decoder;

generate, by a sum-product network (SPN), a second sentence embedding by maximizing a first conditional probability of the second sentence embedding given the first sentence embedding, the SPN being configured to maximize the first conditional probability using a learned joint probability distribution of sentence embeddings for both the first language and a second language; and decode, by a second decoder of a second autoencoder, the second sentence embedding into a vector representation of a second textual sequence in the second language, the second autoencoder including a second encoder and the second decoder.

14. The non-transitory computer-readable medium of claim 13, wherein:

the second autoencoder is trained to encode, using the second encoder, the vector representation of the second textual sequence in the second language into the second sentence embedding;

the SPN is trained to generate the first sentence embedding by maximizing a second conditional probability of the first sentence embedding given the second sentence embedding, the SPN being configured to maximize the second conditional probability using the learned joint probability distribution; and the first autoencoder is trained to decode, using the first decoder, the first sentence embedding into the vector representation of the first textual sequence in the first language.

15. The non-transitory computer-readable medium of claim 13, wherein each of the first encoder, the first decoder, the second encoder and the second decoder independently comprises: a recurrent neural network (RNN), a convolutional neural network (CNN), or a transformer neural network.

16. The non-transitory computer-readable medium of claim 13, wherein the SPN comprises a plurality of layers, each layer independently formed by a plurality of sum-nodes or a plurality of product-nodes.

17. The non-transitory computer-readable medium of claim 13, wherein the first and second autoencoders are trained together in a first training phase, to:

at the first and second autoencoders, encode vector representations of first and second training textual sequences from the first and second languages into respective first and second training sentence embeddings;

at the first and second autoencoders, decode first and second training sentence embeddings into respective vector representations of first and second reconstructed textual sequences in the first and second languages; and adjust weights of the first and second autoencoders to minimize a loss function representing reconstruction losses between the first and second reconstructed textual sequences and the respective first and second training textual sequences.

18. The non-transitory computer-readable medium of claim 17, wherein the SPN is trained in a second training phase, to:

learn the learned joint probability distribution by adjusting weights of the SPN to maximize a joint probability of the first and second training sentence embeddings; and calculate maximized conditional probabilities using the joint probability.

* * * * *